(12) United States Patent
Saito et al.

(10) Patent No.: US 8,161,503 B2
(45) Date of Patent: Apr. 17, 2012

(54) OBJECTIVE LENS ACTUATOR AND AN OPTICAL PICKUP

(75) Inventors: Keiko Saito, Kitaibaraki (JP);
Katsuhiko Kimura, Kasumigaura (JP);
Takahiro Yamaguchi, Yokohama (JP);
Yoshihiro Sato, Hitachinaka (JP)

(73) Assignee: Hitachi Media Electronics Co., Ltd., Iwata (JP)

( * ) Notice: Subject to any disclaimer, the term of this patent is extended or adjusted under 35 U.S.C. 154(b) by 58 days.

(21) Appl. No.: 12/540,439

(22) Filed: Aug. 13, 2009

(65) Prior Publication Data
US 2010/0067352 A1 Mar. 18, 2010

(30) Foreign Application Priority Data

Sep. 16, 2008 (JP) ................................. 2008-235851

(51) Int. Cl.
*G11B 7/12* (2006.01)
(52) U.S. Cl. ................................. 720/671; 369/112.23
(58) Field of Classification Search ............. 369/112.23; 720/681, 671
See application file for complete search history.

(56) References Cited

U.S. PATENT DOCUMENTS

| | | | | |
|---|---|---|---|---|
| 7,852,737 B2 * | 12/2010 | Hatano | ..................... | 369/112.24 |
| 2006/0114769 A1 * | 6/2006 | Mashiyama et al. | ....... | 369/44.14 |
| 2007/0014205 A1 * | 1/2007 | Inui | .............. | 369/44.14 |
| 2008/0052734 A1 * | 2/2008 | Arai et al. | ....................... | 720/681 |
| 2008/0080330 A1 * | 4/2008 | Sasaoka | ...................... | 369/44.11 |
| 2009/0013341 A1 * | 1/2009 | Hayashi et al. | ............... | 720/648 |

FOREIGN PATENT DOCUMENTS

| | | |
|---|---|---|
| CN | 1808590 A | 7/2006 |
| JP | 2005-251246 | 9/2005 |
| JP | 2006-18978 | * 1/2006 |
| JP | 2006-338783 | * 12/2006 |
| JP | 2008-052812 | 3/2008 |
| JP | 2008-065889 | * 3/2008 |
| WO | WO 2008/096565 | 8/2008 |

OTHER PUBLICATIONS

MAT of JP 2006-338783.*
MAT of JP 2006-18978.*
MAT of JP 2008-065889.*
MAT (machine assited translation)JP 2005-251246.*
Office Action issued in Chinese Patent Application No. 200910166798.6 on Apr. 8, 2011.

* cited by examiner

*Primary Examiner* — Aristotelis Psitos
(74) *Attorney, Agent, or Firm* — Antonelli, Terry, Stout & Kraus, LLP.

(57) ABSTRACT

An objective lens actuator comprises, two objective lenses, each for focusing lights upon an optical disc, an objective lens holder member for holding the objective lenses thereon, and lens protectors for preventing the objective lenses from being contacted on the optical disc, wherein the lens protectors include first and second lens protectors, which are provided on both end portions of the objective lens holder member in a tracking direction, and a third lens protector, which is provided in a middle of the two objective lenses, wherein the first and second lens protectors, which are provided on both end portions of the objective lens holder member in the tracking direction, are provided the objective lenses and end portion of the objective lens holder member in the tracking direction, and the third lens protector, which is provided between the objective lenses, has a height closer to that of the optical disc than the protectors, which are provided on both end portions of the objective lens holder member in the tracking direction.

3 Claims, 6 Drawing Sheets

OBJECTIVE LENS ACTUATOR AND AN OPTICAL PICKUP

BACKGROUND OF THE INVENTION

The present invention relates to an optical pickup for conducting recording and/or reproducing of information through irradiation of a light upon an optical disc, and it relates to, in particular, an objective lens actuator mounting lens protectors therein, for protecting objective lenses from contacting upon the optical disc, and also relates to an optical pickup equipped with the same.

In recent years, in particular, with an optic disc apparatus, advancement is made on high-speed of data transfer rate with high-density thereof. An optical pickup is one of the important parts of the optical disc apparatus, for conducing the recording/reproducing of data.

Among the structures of the optical pickup, the objective lens actuator is an apparatus for driving an objective lens, which focuses a laser beam upon a recording surface on the optical disc, in a focusing direction (i.e., a direction of approaching/receding to the optical disc surface), a tracking direction (i.e., a direction of radius of the disc) and a radial tilt direction (i.e., an inclination in the radial direction of the optical disc). For achieving the high-density within the optical disc apparatus, advancement is made on shortening the wavelength of the laser beam, and accompanying this, the focus distance comes to be narrow between the optical disc and the objective lens. For this reason, when driving the objective lens in the focusing direction, sometimes they fall down in such cases where the optical disc and the objective lens cannot keep sufficient gap or distance between them, so that they contact with each other; and this gives an ill influence upon the performances of the optical disc apparatus.

With the conventional art shown in the following Patent Document 1, a lens protector is mounted on a moving part mounted the objective lens thereon, on a side surface thereof in the tracking direction of the objective lens, and further a disc protector is mounted on a protection cover for protecting the moving part; thereby achieving counter measures against scratches on the optical disc and the lens.

Further, with the conventional art described in the following Patent Document 2, a lens protector is mounted on the moving part mounting the objective lens thereon, on the side surface in the tracking direction of the objective lens, through application, and further a pair of lens protectors, differing from on the hardness and the height, are mounted in the rotation direction of the optical disc and in the vicinity of the lens protector mentioned above; thereby achieving the countermeasure against the scratch on the optical disc.

[Patent Document 1] Japanese Patent Laying-Open No. 2005-251246 (2005); and

[Patent Document 2] Japanese Patent Laying-Open No. 2008-52812 (2008).

BRIEF SUMMARY OF THE INVENTION

As was mentioned in the conventional arts, a convex portion made of an adhesive material, which is provided on an attaching member of the objective lens, achieves a roll of protecting the optical disc and the objective lens from contacting on each other.

In the case of the objective lens actuator having compatibility between a high-density optical disc, such as, Blu-Ray, etc., and CD and DVD up to now, there is necessity of applying an objective lens having high NA (Numerical Aperture); however, due to the problems of using a light, etc., there must be mounted two (2) sets of objective lens. Further, for the purpose of increasing the driving efficiency of the objective lens actuator, there are problems to be dissolved, in the light-weighting and small-sizing of the object lenses. With this, the shortened distance between the optical disc and the focus of the objective lens shortened, which is brought about due to the high NA, is further narrowed.

In case where two (2) or more of objective lenses are aligned in the tracking direction within a moving part of the objective lens actuator, when the objective lenses are inclined in a radial tilt direction, there occurs a phenomenon that one objective lens approaches to the optical disc while the other objective lens recedes within the moving part. When the objective lens receding is under the operation thereof, depending upon the focus distance or the height of the lens protector, there is a case that the optical disc cannot be set at the focus distance of the objective lens under the operation if the optical disc does not contact with the lens protector. In this case, it can be dissolved by setting the height of the lens protector to be nearly equal to the height of the objective lens; however, since the lens protector is worn out every time when it contacts on the optical disc, therefore there is a problem that the reliability is worsened remarkably.

In case that there is only one objective lens in the conventional structures, a member in the nearest or closest vicinity of the optical disc is always the lens protector, in spite of any kind of posture of the objective lens, and therefore the objective lens can be protected. Also, there is no necessity of making the objective lens small in the size; there is a problem of narrowing of the focus distance only due to the high NA. In this manner, with the objective lens actuator, mounting two (2) sets of objective lens small-sized, there is bout about a necessity of taking a relationship of heights of the objective lens and the focus distance into the consideration thereof.

Accordingly, it is necessary to make a control on the position and the height of the lens protector, for maintaining the reliability while keeping an appropriate distance or gap between them, but not allowing the objective lenses, being aligned by a number of two or more in the tracking direction, to contact on the optical disc, within the moving part of the objective lens actuator.

An object, according to the present invention, is to provide an objective lens actuator and an optical pickup, mounting thereon a lens protector for ensuring an operable region of the objective lenses in the focusing direction thereof, while maintaining the focus distance thereof.

According to the present invention, the object mentioned above is accomplished by an objective lens actuator, comprising: two objective lenses, each for focusing lights upon an optical disc; an objective lens holder member for holding the objective lenses thereon; and lens protectors for preventing said objective lenses from being contacted on the optical disc, wherein said lens protectors include first and second lens protectors, which are provided on both end portions of said objective lens holder member in a tracking direction, and a third lens protector, which is provided in a middle of said two objective lenses, wherein said first and second lens protectors, which are provided on both end portions of said objective lens holder member in the tracking direction, are provided said objective lenses and end portion of said objective lens holder member in the tracking direction, and the third lens protector, which is provided between said objective lenses, has a height closer to that of the optical disc than the protectors, which are provided on both end portions of said objective lens holder member in the tracking direction.

Also, according to the present invention, the object mentioned above is accomplished by an objective lens actuator, comprising: two objective lenses, each for focusing lights upon an optical disc; an objective lens holder member for holding the objective lenses thereon; and lens protectors for preventing said objective lenses from being contacted on the optical disc, wherein said lens protectors are provided at four positions, including between said objective lenses and end portions of the objective lens holder member in a tracking direction, wherein first and second lens protectors are provided on both end portions of said objective lend holder member, and third and fourth lens protectors are provided between said two objective lenses in a tangential direction, so that they come to be nearer to the optical disc than said first and second lens protectors.

The present invention is effective for avoiding the contact between the optical lens and the objective lenses, which will be caused when the objective lenses are inclined or tilted, and also for maintaining a sufficient gap between them even when the optical disc approaches just onto the objective lens. Moreover, it is possible to provide the objective lens actuator and the optical pickup, resulting into an improvement of accuracy of recording/reproducing of the optical disc, and thereby increasing the reliability thereof.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Hereinafter, embodiments according to the present invention will be fully explained by referring to the attached drawings.

A first embodiment of the present invention will be explained by referring to FIGS. 1, 2, 3, 4 and 5 attached herewith.

Figure 1:
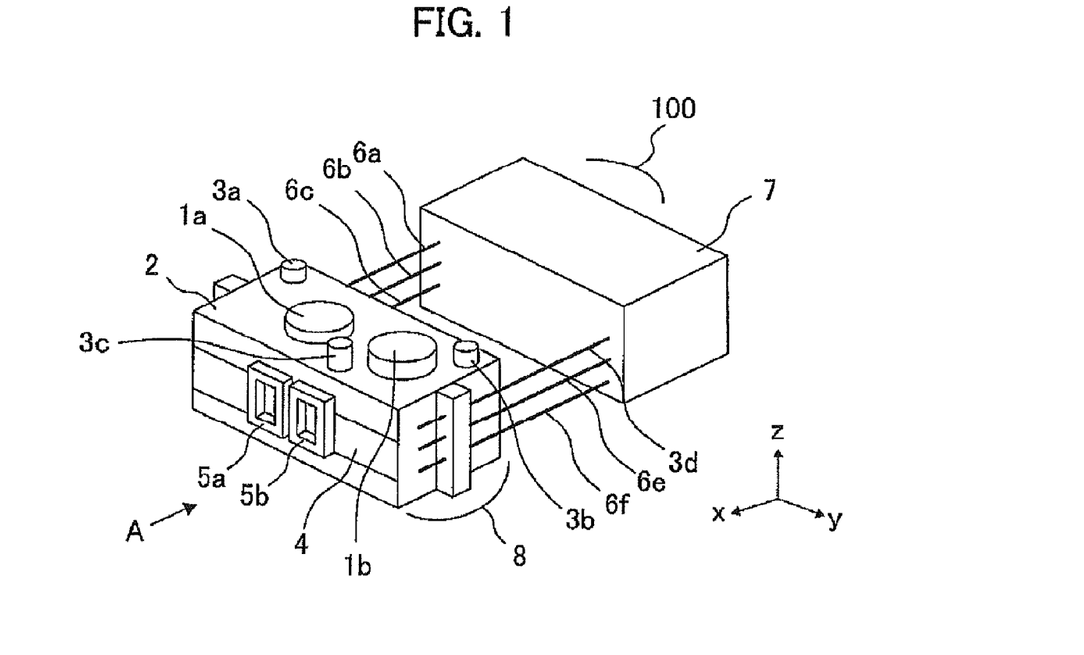
FIG. 1 is a perspective view of a first embodiment of an objective lens supporting member in an objective lens actuator, according to the present invention.

FIG. 1 is a perspective view for showing an objective lens actuator in relation to an optical pickup according to a present embodiment.

Figure 2:
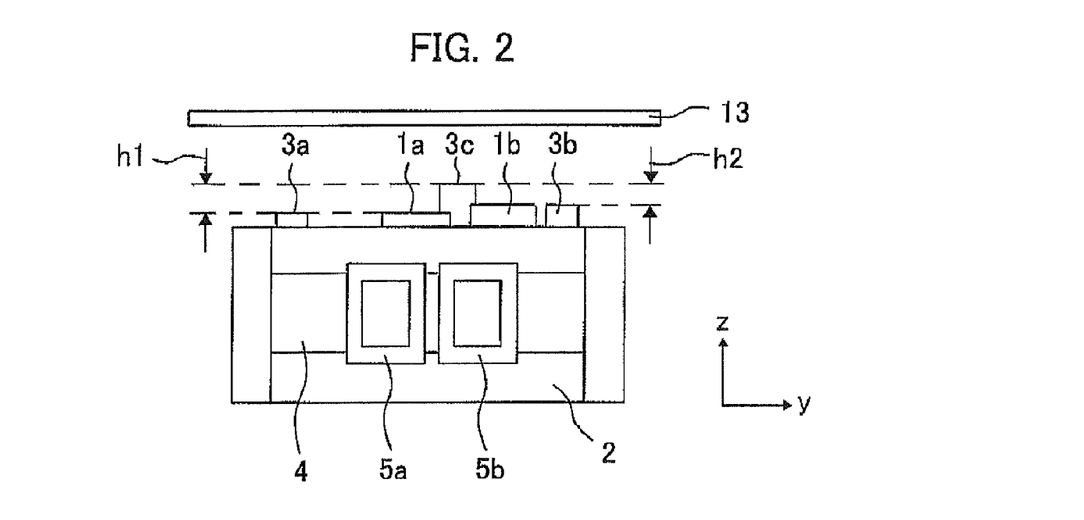
FIG. 2 is a side view in direction of an arrow "A", for showing the first embodiment of a moving part in the objective lens actuator, according to the present invention.

FIG. 2 is a view seeing the above in direction "A".

Figure 3:
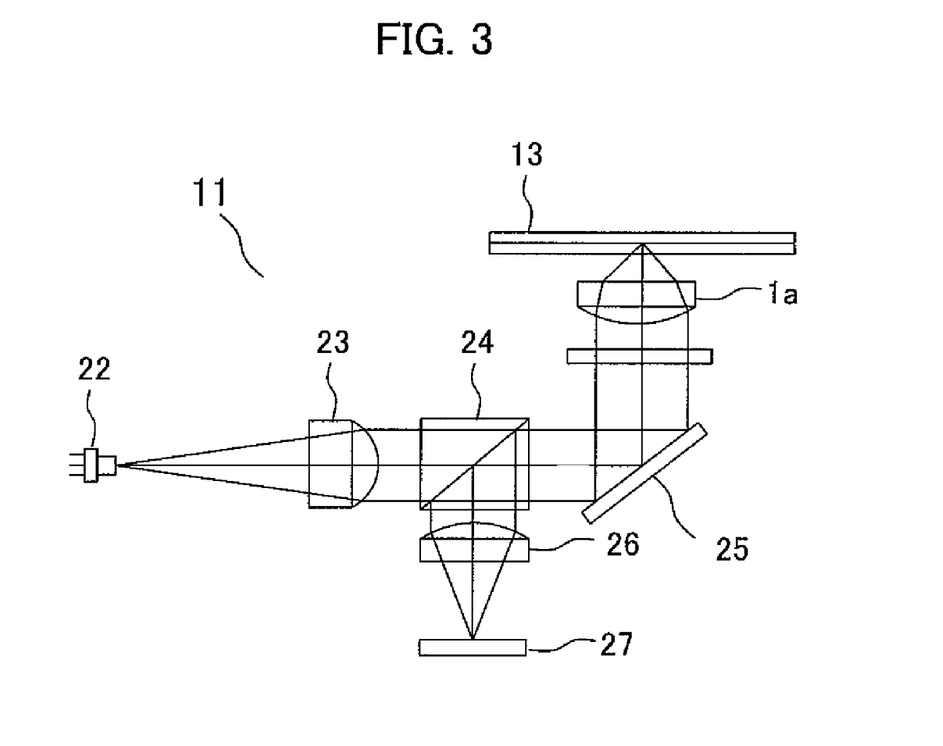
FIG. 3 is an outline view for showing the structures of an optical system of the objective lens actuator, according to the present invention.

FIG. 3 is an outline view for showing the structures of optical parts of the optical pickup.

Figure 4:
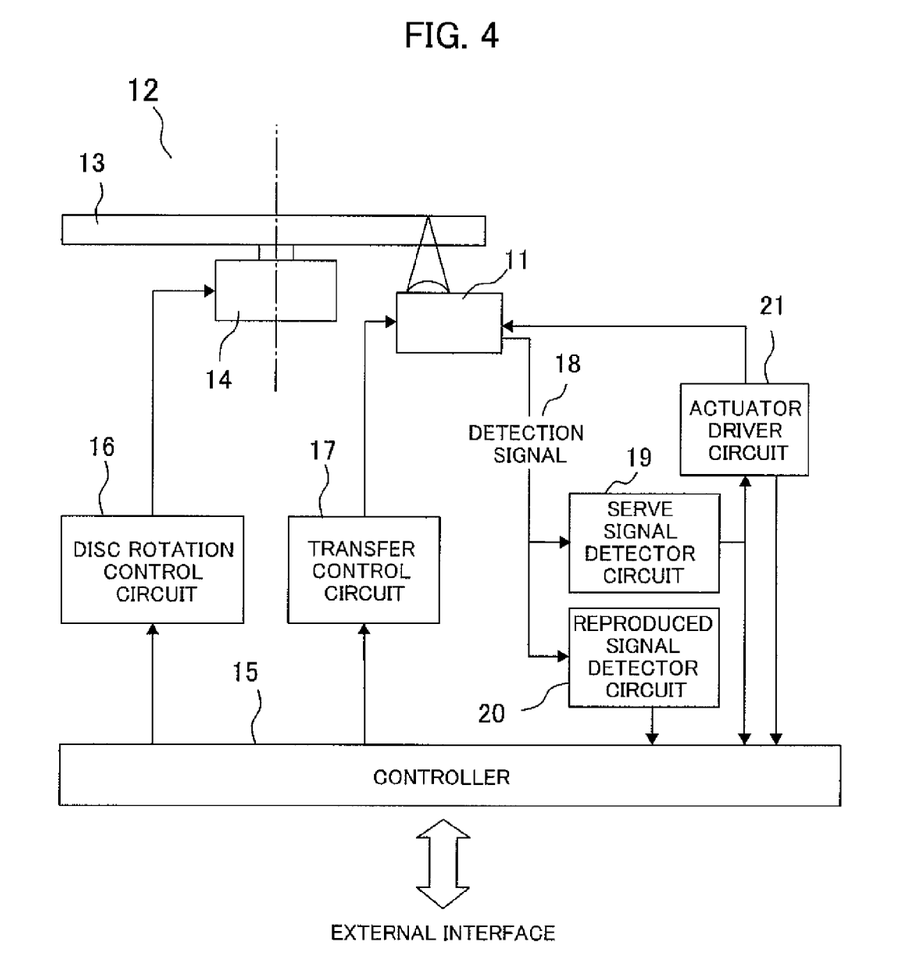
FIG. 4 is a block diagram for showing the structures of the objective lens actuator, according to the present invention.

FIG. 4 is a block diagram for showing the structures of the optical disc apparatus, according to the present invention.

Figure 5:
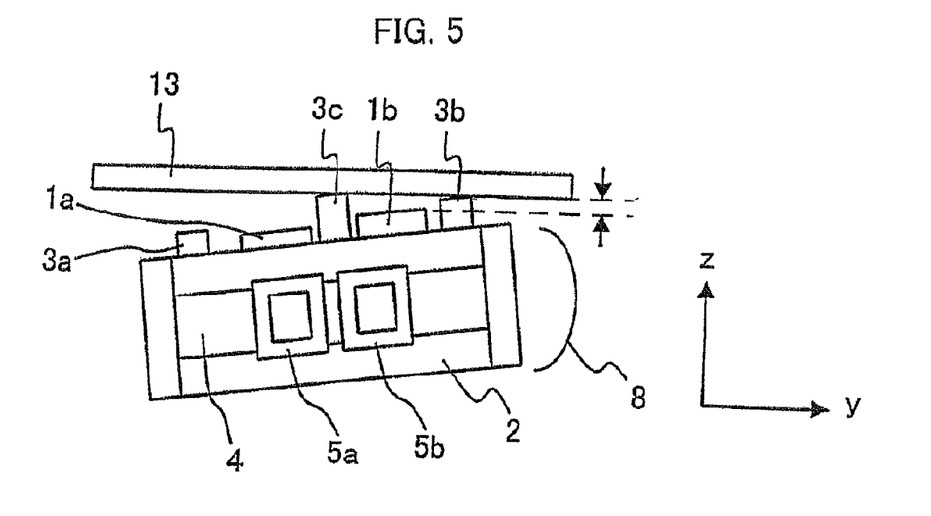
FIG. 5 is a view for showing the objective lens actuator, according to the present invention, in particular when it is inclined with respect to an optical disc.

FIG. 5 is a view for showing the condition when a moving part, including the objective lenses according to the present invention, is inclined to an optical disc.

The distinctive feature according to the present embodiment lies in that an objective lens actuator 100 is obtained, wherein lens protectors 3a, 3b and 3c are provided at a middle between objective lenses 1a and 1b and at both ends of an objective lens holding member 2 in a tracking direction, and the lens protector 3c, which is provided between the lenses 1a and 1b, has a height being closer to the optical disc 13 than the lens protectors 3a and 3b, which are provided on both ends of the objective lens holding member 2 in the tracking direction.

Explanation will be made on the structures of the present embodiment, by referring to the FIGS. 1 and 2. A moving part 8 is fixed on an elastic supporting member fixing part 7 through elastic supporting members 6a, 6b, 6c, 6d, 6e and 6f. The moving part is constructed with the objective lens holding member 2, objective lenses 1a and 1b, the lens protectors 3a, 3b and 3c, a focus coil 4, and tracking coils 5a, 5b, 5c and 5d. The objective lenses 1a and 1b are disposed to align in the tracking direction.

In the vicinity of the objective lenses 1a and 1b are provided the lens protectors 3a, 3b and 3c. The lens protectors 3a and 3b have the height a little bit nearer or closer to the optical disc 13 than the heights of the objective lenses 1a and 1b, and the lens protector 3c is separated far from the optical disc. Also, the lens protector 3b is closer to the optical disc 13 than the lens protector 3a. Thus, the heights of the respective lens protectors are so determined that, in the differences of heights "h1" and "h2", "h1" is greater than "h2". Also, onto the moving part 8 are attached the focus coil 4 and the tracking coils 5a, 5b, 5c and 5d, as the driving coils thereof, and the moving part 8 is driven through electromagnetic force between the permanent magnets not shown in the figure.

Next, explanation will be made on the structures of the optical pickup 11, by referring to FIG. 3. This figure shows the structures of optical parts with using the objective lens 1a therein. The optical pickup 11 is a constituent element thereof, and it irradiates a light beam emitted from a light source 22 upon the optical disc 13, and thereby conducting reading/writing of information recorded on the optical disc. The optical pickup 11 comprises the light source 22 made from a semiconductor, a collimate lens 23, a beam splitter 24 for guiding a reflection light upon the optical disc 13 into a photo detector 27, a rise-up mirror 25 for reflecting the light beam directing to the recording surface of the optical disc 13, the objective lens for focusing the light beam upon the recording surface of the optical disc 13, and the photo detector 27 for converting the reflection light from the optical disc 13 into an electric signal, so as to output it to a signal processing portion.

Next, explanation will be made on the structures of the optical disc apparatus 12. It comprises a spindle motor 14 for rotating the optical disc 13, the optical pickup 11, a transfer mechanism for moving the optical pickup 11 into the radial direction of the optical disc 13, and a controller for controlling those, etc. To the controller 15 are connected a rotation control circuit 16 and a transfer control circuit 17.

The rotation control circuit 16 is connected to the spindle motor 14 through the controller 15, so that it conducts the rotation control of the optical disc 12. Also, the transfer control circuit 17 moves the optical pickup 11 into the radial direction of the optical disc 13. A signal 18 detected by the optical pickup 11 is sent to a servo signal detector circuit 19 and a reproduced signal detector circuit 20. By the servo signal detector circuit 19 are produced a focus error signal and a tracking error signal, and the control is conducted upon the positions of the objective lenses 1a and 1b in the focusing direction and the tracking direction, so that the error signals goes down to the minimum.

Explanation will be made on the operation of the optical pickup 11, including the objective lens actuator 100 according to the present embodiment therein. A user loads the optical disc 13 into the optical disc apparatus 12. After this, the optical disc 13 starts the rotation thereof, and the optical pickup conducts a focusing pull-in operation for adjustment of the focus thereof. Thereafter, the optical pickup 11 conduct a tracking pull-in operation, so as to follow a track on the optical disc 13.

The optical disc 13, being ready for recording/reproducing in this manner, conducts the recording and the reproducing upon a signal, which is sent from a PC through the optical disc apparatus 12. Within a series of those operations, since the objective lenses 1a and 1b must be always in parallel with the optical disc 13, therefore in case when the optical disc 13 is deformed, in particular, like an umbrella-like, it is necessary to incline the moving part 8 within the objective lens actuator 100, much more, as it goes to an outer periphery side thereof, along warping of the optical disc 13. However, due to external forces, such as, impact acting upon the objective lenses 1a and 1b, etc., there are cases where the parallelism cannot be kept between the optical disc 13 and the objective lenses 1a and 1b.

For example, in case when the objective lens 1a is inclined into a radial direction, the lens protector 3b near or close to a side of the optical disc 13, as is shown in FIG. 5, will not affect an ill influence upon the distance between the optical disc 13 and the objective lens 3b, i.e., for maintaining the focus distance. As a result thereof, it is possible to obtain stability of the servo control, and in the turn to record/reproduce the optical disc 13 with stability.

As was mentioned above, with the present embodiment, it is possible to obtain the objective lens actuator, not obstructing the operable region of the objective lenses while avoiding the contact between the optical disc and the objective lens even if the objective lens inclines in the radial direction.

Embodiment 2

Figure 6:
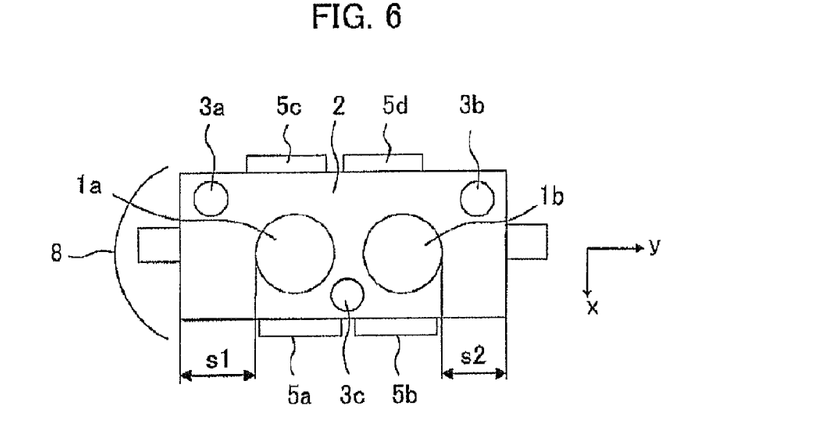
FIG. 6 is a plane view for showing a second embodiment of the moving part in the objective lens actuator, according to the present invention.
Figure 7:
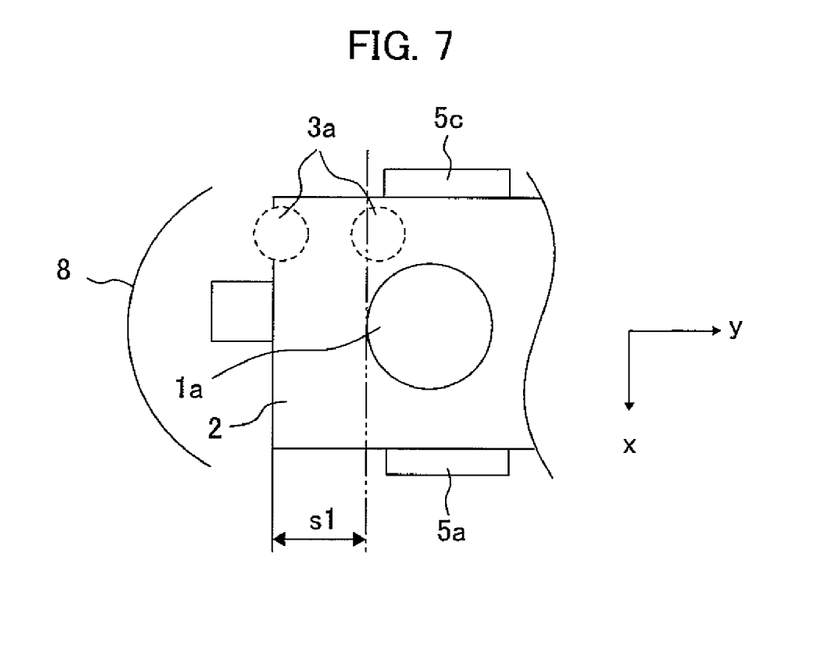
FIG. 7 is a plane view for showing the second embodiment of the moving part in the objective lens actuator, according to the present invention.

Explanation will be made on a second embodiment, by referring to FIGS. 6 and 7. FIG. 6 is a plane view of the moving part according to the present invention. FIG. 7 us a plane view for showing an embodiment in accordance with the moving part of the present invention. The distinctive feature of the present embodiment lies in that the lens protectors 3a, 3b and 3c are provided at three (3) positions on an objective lens holder member.

The positions where the lens protectors 3a and 3b should be provided are preferably at "s1" and "s2" between the end portions of the objective lenses 1a and 1b and the objective lens holder member 2. Also, the lens protectors 3a and 3b may be provided to contact with a line, being in parallel with the peripheral direction of the optical disc, contacting with the left end of the objective lens 1a and the right end of the objective lens 1b. This means that the lens protectors are located in an inner periphery side than the objective lens 1a or 1b, which are in the inner periphery side of the optical disc, and in an outer periphery side than the objective lens 1b or 1a, which are in the outer periphery side thereof.

With such the structures mentioned above, even if an inclination occurs on the objective lens 1a or 1b in the radial direction to the optical disc, since the lens protector 3a and 3b are higher than the objective lenses 1a and 1b, they never contact with the optical disc 13.

As was mentioned above, with the present embodiment, it is possible to obtain the objective lens actuator to maintain the operable region of the objective lenses while keeping the focus distance of the objective lens when the objective lens inclines in the radial direction with respect to the optical disc.

Embodiment 3

Figure 8:
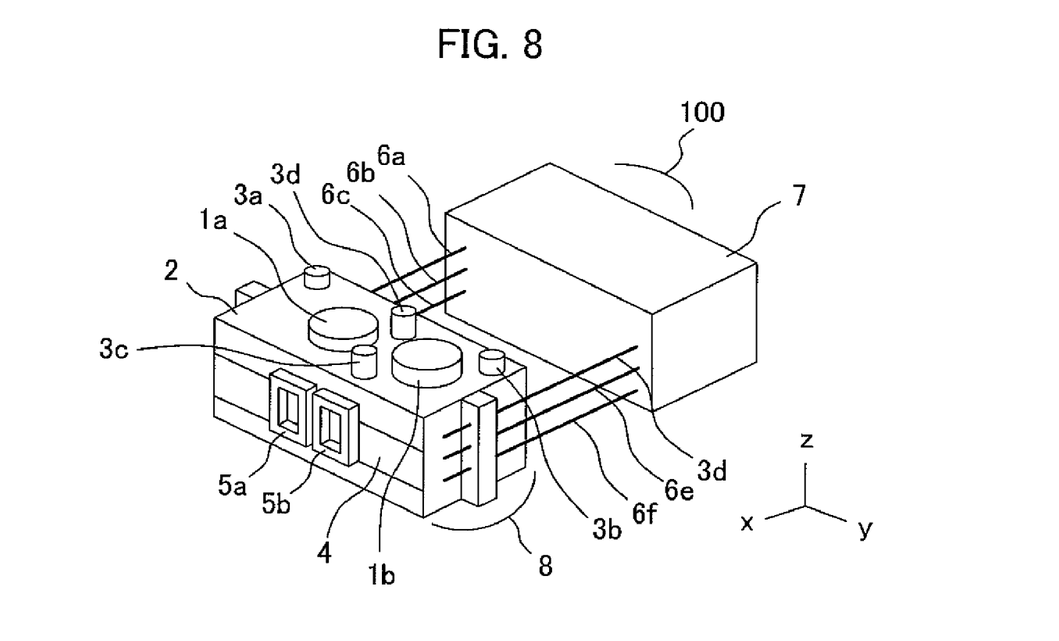
FIG. 8 is a perspective view of a third embodiment of the objective lens supporting member in the objective lens actuator, according to the present invention.
Figure 9:
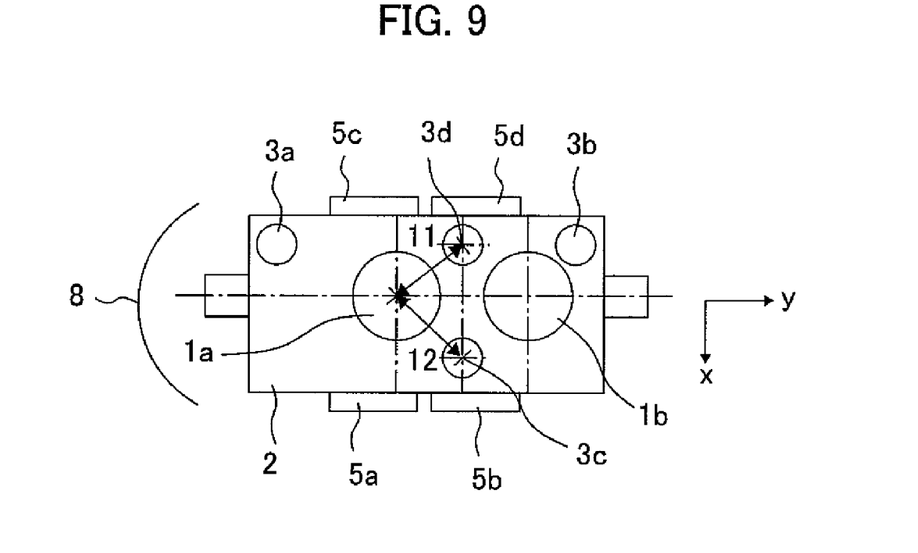
FIG. 9 is a plane view for showing the third embodiment of the moving part in the objective lens actuator, according to the present invention.

Explanation will be made on a third embodiment, by referring to FIGS. 8 and 9. FIG. 8 is a perspective view for showing an objective lens actuator according to the optical pickup of the present embodiment, and FIG. 9 is a front view thereof. The distinctive feature of the present embodiment lies in that the lens protectors 3a, 3b, 3c and 3c are provided at four (4) positions, wherein first and second lens protectors 3a and 3b are provided at both end portions of the objective lens holder member 2 in the tracking direction, and third and fourth lens protectors 3c and 3d are provided between two (2) sets of objective lenses 1a and 1b in a tangential line direction, so that they are nearer or closer to the optical disc 13 than the first and second lens protectors 3a and 3b.

Both the distance between a center of the objective lens 1a and the lens protector 3c and that from the lens protector 3d are same to each other. When the objective lens actuator 100 actually drives, due to heat generation of the tracking coils 5a, 5b, 5c and 5d, which are mounted on the moving part 8, the objective lens 1a is heated unequally, and therefore deformed configuration thereof due to the heat also come to be unequal. For this reason, optical aberrations are generated in the objective lenses 1a and 1b, and the optical characteristics thereof are deteriorated. However, by adding the lens protector 3d at the position symmetric to the lens protector 3c in the peripheral direction, as in the present embodiment, the lens protectors 3c and 3d function as a heat radiating portion.

As a result thereof, temperature distribution come to be equal on the objective lens 1a, between the tracking coil 5a side of and the tracking coil side 5c thereof, then the thermal deformation of the lens comes to be nearly point-symmetric with respect to a lens center, and therefore it is possible to suppress generation of the optical aberrations. With this, it is possible to suppress the deterioration in the optical characteristics of the objective lenses 1a and 1b.

As was mentioned above, according to the present embodiment, it is possible to obtain the objective lens actuator having a high reliability, since the thermal deformation of the objective lenses by the coils does not affect no ill influence.

Embodiment 4

Explanation will be made on a fourth embodiment, by referring to FIG. 10.

Figure 10:
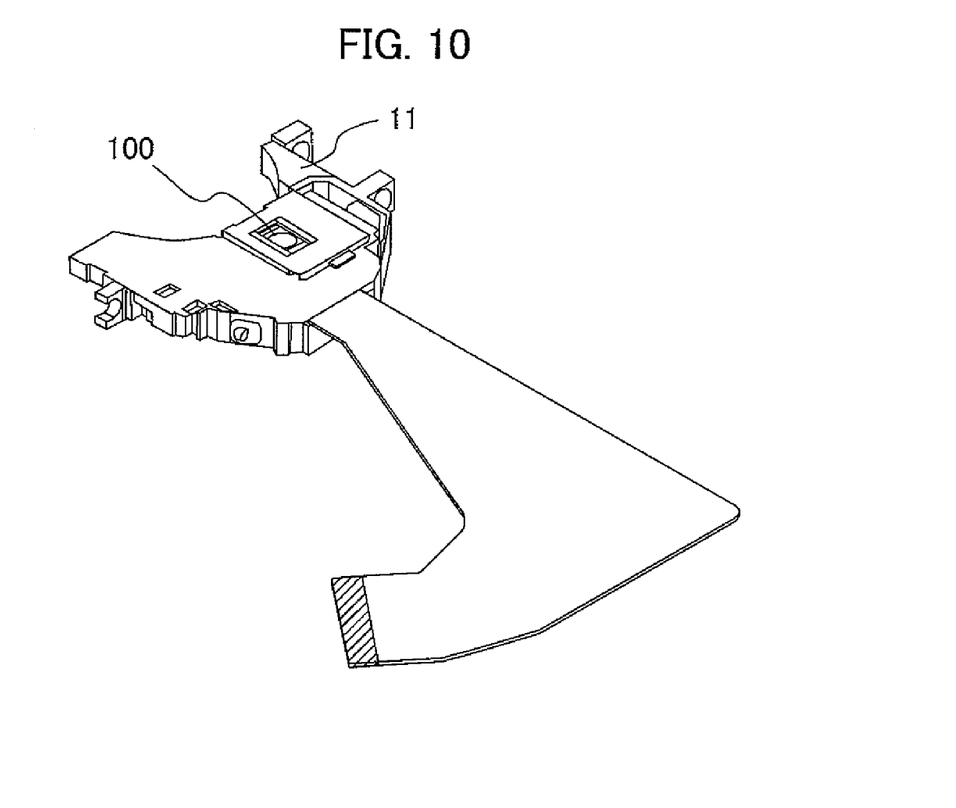
FIG. 10 is a perspective view for showing a fourth embodiment of the optical pickup, which applies the objective lens actuator according to the present invention therein.

FIG. 10 is a perspective view for showing an objective lens actuator 100, according to the optical pickup 11 of the present embodiment.

The distinctive feature of the present embodiment lies in that the optical pickup is characterized by having the objective lens actuators described in the embodiments 1 to 3.

As is shown in FIG. 10, the objective lens actuator 100 is provided within the optical pickup 11. Lights emitting from a light emitting element not shown in the figure are focused on the optical disc 13 by means of the objective lenses 1a and 1b. In this manner, with using the objective lens actuator according to the present invention, it is possible to build up the optical pickup suitable for high density.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An objective lens actuator, comprising:
   two objective lenses, the height of one objective lens being different from the height of another objective lens, with each objective lens focusing lights upon an optical disc;
   an objective lens holder member for holding the objective lenses thereon with aligning them in a tracking direction; and
   a first, a second and a third lens protectors, provided on said objective lens holder member, for preventing said objective lenses from being contacted on the optical disc, wherein
   said first and second lens protectors, are provided on both ends of said objective lens holder member in a tracking direction, near ends of said two objective lenses, respectively, with the height of said second lens protector is being closer to the optical disc than said first lens protector and said third lens protector is provided between said two objective lenses and its height is the closest to that of the optical disc than heights of said first and second lens protectors.

2. An optical pickup having the objective lens actuator described in the claim 1.

3. The objective lens actuator according to claim 1, wherein a difference in height among said first, second and third lens protectors, in particular said third lens protector having the height closer to that of the optical disc than heights of said first and second lens protectors, allows said lens protector near to a side of said optical disc to avoid an ill influence upon a distance between said optical disc and said objective lens, when said objective lens is inclined into a radial direction.

* * * * *